US012365085B2

(12) United States Patent
Ranjbar et al.

(10) Patent No.: US 12,365,085 B2
(45) Date of Patent: Jul. 22, 2025

(54) METHOD FOR TRAINING A CONTROL ARRANGEMENT FOR A CONTROLLED SYSTEM

(71) Applicant: Robert Bosch GmbH, Stuttgart (DE)

(72) Inventors: Alireza Ranjbar, Zürich (CH); Gerhard Neumann, Karlsruhe (DE); Anh Vien Ngo, Nehren (DE); Hanna Ziesche, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 279 days.

(21) Appl. No.: 17/662,123

(22) Filed: May 5, 2022

(65) Prior Publication Data

US 2022/0371185 A1    Nov. 24, 2022

(30) Foreign Application Priority Data

May 10, 2021 (DE) ..................... 10 2021 204 699.1

(51) Int. Cl.
*B25J 9/16* (2006.01)
*G05B 19/4155* (2006.01)

(52) U.S. Cl.
CPC ............. *B25J 9/163* (2013.01); *B25J 9/161* (2013.01); *G05B 19/4155* (2013.01); *G05B 2219/40269* (2013.01)

(58) Field of Classification Search
CPC .......... B25J 9/161; B25J 9/163; B25J 9/1687; G05B 19/4155; G05B 2219/40269
See application file for complete search history.

(56) References Cited

U.S. PATENT DOCUMENTS

| 9,314,924 B1* | 4/2016 | Laurent | ............... B25J 9/163 |
| 10,611,026 B1* | 4/2020 | Sun | ............... G06N 7/01 |

(Continued)

OTHER PUBLICATIONS

Y. P. Pane, S. P. Nageshrao and R. Babuška, "Actor-critic reinforcement learning for tracking control in robotics," 2016 IEEE 55th Conference on Decision and Control (CDC), Las Vegas, NV, USA, 2016, pp. 5819-5826, doi: 10.1109/CDC.2016.7799164, Accessed Apr. 3, 2024.*

(Continued)

*Primary Examiner* — Thomas E Worden
*Assistant Examiner* — Blake A Wood
(74) *Attorney, Agent, or Firm* — NORTON ROSE FULBRIGHT US LLP

(57) ABSTRACT

A method for training a control arrangement for a controlled system. The control arrangement includes a regulation device and an actuator that operates according to a control strategy. The method includes the generation of control actions by the regulation device, each control action being generated by detecting measured variables that indicate a state of the controlled system, ascertaining a correction term for the detected measured variables by the actuator according to the control strategy, adapting the detected measured variables using the correction term for the detected measured variables, and generating the control action by supplying the adapted measured variables to the regulation device as the actual value. The method further includes training the control strategy by reinforcement learning for maximizing the gain that is achieved by the generated control actions.

6 Claims, 5 Drawing Sheets

(56) References Cited

U.S. PATENT DOCUMENTS

| | | | |
|---|---|---|---|
| 11,565,412 B2* | 1/2023 | Sindhwani | B25J 9/1664 |
| 2019/0054619 A1* | 2/2019 | Mönnich | B25J 9/163 |
| 2020/0104684 A1* | 4/2020 | Vecerik | G06N 3/047 |
| 2020/0324410 A1* | 10/2020 | Bergantz | B25J 9/1664 |
| 2022/0245503 A1* | 8/2022 | Li | G06N 5/04 |

OTHER PUBLICATIONS

B. Kiumarsi, K. G. Vamvoudakis, H. Modares and F. L. Lewis, "Optimal and Autonomous Control Using Reinforcement Learning: A Survey," in IEEE Transactions on Neural Networks and Learning Systems, vol. 29, No. 6, pp. 2042-2062, Jun. 2018, doi: 10.1109/TNNLS.2017.2773458, Accessed Apr. 3, 2024.*

A. Akbarimajd, "Reinforcement Learning Adaptive PID Controller for an Under-actuated Robot Arm", ijie, vol. 7, No. 2, Oct. 2015, Accessed Apr. 3, 2024.*

T. Silver, K. Allen, J. Tenenbaum, L. Kaelbling, "Residual Policy Learning", arXiv preprint arXiv:1812.06298, Dec. 2018, Accessed Apr. 3, 2024.*

Daumé III, Hal, John Langford, and Amr Sharaf. "Residual loss prediction: Reinforcement learning with no incremental feedback." International Conference on Learning Representations. 2018.*

Schoettler, Gerrit, et al. "Deep reinforcement learning for industrial insertion tasks with visual inputs and natural rewards." 2020 IEEE/RSJ Internation Confrence on Intelligent Robots and Systems (IROS). IEEE, 2020. (Year: 2020).*

Johannink et al., "Residual Reinforcement Learning for Robot Control," Cornell University, 2018, pp. 1-8.

Zhang et al., "Deep Residual Reinforcement Learning," Cornell University, 2020, pp. 1-9.

* cited by examiner

METHOD FOR TRAINING A CONTROL ARRANGEMENT FOR A CONTROLLED SYSTEM

CROSS REFERENCE

The present application claims the benefit under 35 U.S.C. § 119 of German Patent Application No. DE 10 2021 204 699.1 filed on May 10, 2021, which is expressly incorporated herein by reference in its entirety.

BACKGROUND INFORMATION

The present description relates to a method for training a control arrangement for a controlled system.

Conventional controllers may be used for a variety of applications, and allow numerous control tasks to be solved efficiently. Nevertheless, for complex tasks, such as for the assembly of devices by a robot, it is desirable to further improve the control. One approach is the use of reinforcement learning (RL) in order to train an actuator to generate correction terms for the control signals that are output by a controller. Such an approach is described in the paper "Residual reinforcement learning for robot control" by Tobias Johannink et al., arXiv:1812.03201, 2018.

However, the controller may perceive the correction, which actually is intended to assist the control, as a disturbance and may counteract it. Therefore, improved approaches for assisting a conventional controller are desirable.

SUMMARY

According to various specific embodiments of the present invention, a method for training a control arrangement for a controlled system is provided, the control arrangement including a regulation device and an actuator that operates according to a control strategy. The method includes the generation of control actions by the regulation device, each control action being generated by detecting measured variables that indicate a state of the controlled system, ascertaining a correction term for the detected measured variables by the actuator according to the control strategy, adapting the detected measured variables using the correction term for the detected measured variables, and generating the control action by supplying the adapted measured variables to the regulation device as the actual value. The method further includes training the control strategy by reinforcement learning for maximizing the benefit that is achieved by the generated control actions.

By use of the above-described method, the regulation device (a conventional impedance controller, for example) is assisted in the control of the controlled system (a robot, for example) with the aid of reinforcement learning. Compared to an approach in which output control signals (i.e., control actions) that are output by the regulation device are corrected with the aid of an actuator that is trained by reinforcement learning, according to the above-described method the situation is avoided that the regulation device works against the actuator because it perceives the corrections of the actuator as disturbances. In contrast, according to the above-described method, the feedback information, i.e., the feedback, or in other words, the observations of the regulation device, is/are corrected by the actuator. The benefit results, for example, from a reward that is a function of whether the task has been fulfilled (for example, a pin has successfully been inserted by a robot into a hole), but may also be a function, for example, of costs (for example, energy costs for movements of the robot) that are to be reduced, for example.

Various exemplary embodiments are stated below.

Exemplary embodiment 1 is a method for training a control arrangement as described above.

Exemplary embodiment 2 is the method according to exemplary embodiment 1, further including, for each control action, ascertaining a correction term for an output of the regulation device by the actuator according to the control strategy, and generating the control action by adapting the output of the regulation device, using the correction term for the output of the regulation device.

The superimposition with residual feedback (i.e., adapting the detected measured variables using the correction term, as described in exemplary embodiment 1) and the superimposition with residual actions (i.e., adapting the output of the regulation device using the correction term for the output of the regulation device as described in exemplary embodiment 2) have advantages in various phases of the control, depending on the application. The combination of the two approaches thus allows a suitable response to be made in various phases of the control. For example, sudden actions or high-frequency oscillations that are generated using residual actions to loosen a pin (that is stuck due to uncertainty of orientation, for example) as well as flexible spatial movements of the pin while searching for the hole are achieved using residual feedback.

Exemplary embodiment 3 is a method according to exemplary embodiment 1 or 2, the controlled system being a robot including an end effector, the correction term for the detected measured variables by the actuator being an end effector pose correction, and the detected measured variables containing a set of joint positions, and the adaptation of the detected measured variables using the correction term for the detected measured variables, including the conversion of the set of joint positions into an end effector pose, adapting the end effector pose, and back-converting the adapted end effector pose into an adapted set of joint positions.

This approach allows the adaptation of the feedback to be carried out in a representation space that is more relevant for the target task (end effector pose) than the representation space of the joint positions with which the regulation device operates.

Exemplary embodiment 4 is a method according to one of exemplary embodiments 1 through 3, including, for each control action, detecting further measured variables that indicate the state of the controlled system, and ascertaining the correction term for the detected further measured variables by the actuator according to the control strategy by processing the detected further measured variables with the aid of a neural network.

In other words, the actuator may be implemented by a neural network that processes further measured variables (i.e., further observations in addition to the measured variables to be adapted). This ensures an effective ascertainment of the correction term by the use of additional information concerning the state of the controlled system, and the use of a neural network for processing same allows efficient training of the control strategy.

Exemplary embodiment 5 is a robotic control device, including a control arrangement and a regulation device and an actuator, the robotic control device being configured to carry out the method according to one of exemplary embodiments 1 through 4.

Exemplary embodiment 6 is a computer program that includes commands which, when executed by a processor, prompt the processor to carry out a method according to one of exemplary embodiments 1 through 4.

Exemplary embodiment 7 is a computer-readable medium that stores commands which, when executed by a processor, prompt the processor to carry out a method according to one of exemplary embodiments 1 through 4.

In the figures, similar reference numerals generally refer to the same parts in all the various views. The figures are not necessarily true to scale, emphasis instead being placed in general on illustrating the features of the present invention. In the following description, various aspects are described with reference to the figures.

DETAILED DESCRIPTION OF EXAMPLE EMBODIMENTS

The following detailed description relates to the figures, which for explanation show particular details and aspects of this disclosure in which the present invention may be carried out. Other aspects may be used, and structural, logical, and electrical modifications may be made, without departing from the scope of protection of the present invention. The various aspects of this disclosure are not necessarily mutually exclusive, since some aspects of this disclosure may be combined with one or multiple other aspects of this disclosure to form new aspects.

Various examples are described in greater detail below.

Figure 1:
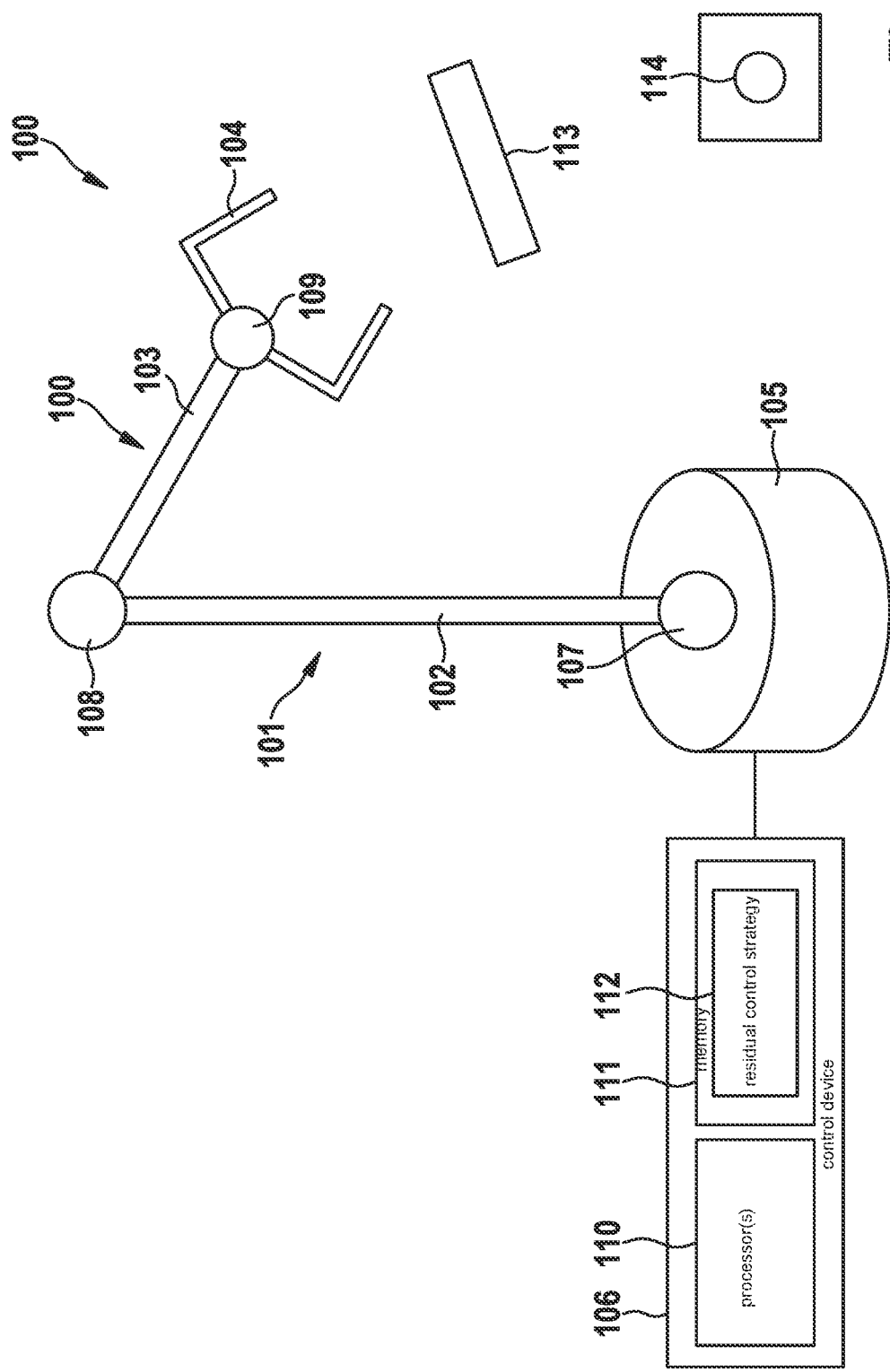
FIG. 1 shows a robot.

FIG. 1 shows a robot 100.

Robot 100 includes a robot arm 101, for example an industrial robot arm for handling or mounting a workpiece (or one or multiple other objects). Robot arm 101 includes manipulators 102, 103, 104 and a base (or support) 105 that supports manipulators 102, 103, 104. The term "manipulator" refers to the movable elements of robot arm 101, whose actuation allows a physical interaction with the environment, for example to perform a task. For the control, robot 100 includes a (robotic) control device 106 that is configured to implement the interaction with the environment according to a control program. Last element 104 (farthest from support 105) of manipulators 102, 103, 104 is also referred to as an end effector 104, and may include one or multiple tools such as a welding torch, a gripping instrument, a painting tool, or the like.

The other manipulators 102, 103 (closer to base 105) may form a positioning device, so that together with end effector 104, robot arm 101 with end effector 104 at its end is provided. Robot arm 101 is a mechanical arm that may fulfill functions similarly to a human arm (possibly including a tool at its end).

Robot arm 101 may include joint elements 107, 108, 109 that connect manipulators 102, 103, 104 to one another and to base 105. A joint element 107, 108, 109 may include one or multiple joints, each of which may provide a rotational movement and/or a translational movement (i.e., a displacement) of associated manipulators relative to one another. The movement of manipulators 102, 103, 104 may be effectuated with the aid of actuators that are controlled by control device 106.

The term "actuator" may be understood as a component that is designed to influence a mechanism or process as a response to being driven. The actuator may convert commands that are output by control device 106 (so-called activation) into mechanical movements. The actuator, for example an electromechanical converter, may be configured to convert electrical energy into mechanical energy upon activation.

The term "control device" may be understood as any type of logic system that is implemented by an entity that may include, for example, a circuit and/or a processor that is capable of executing software that is stored in a memory medium, firmware, or a combination thereof, and that may output commands, for example to an actuator in the present example. The control device may be configured by a program code, for example (software, for example) to control the operation of a robot.

In the present example, control device 106 includes one or multiple processors 110, and a memory 111 that stores program code and data according to which processor 110 controls robot arm 101.

Control device 106 may be, for example, a regulation device 114 that includes a conventional controller (for example, a PID controller, etc.), the regulation device receiving an actual value of the controlled system (in the present case, robot 101 and possibly one or multiple objects 113), compares it to a setpoint value, and supplies the result of the comparison to the controller as a control deviation. The controller generates from the control deviation a variable for the controlled system, which in turn results in a new actual value. The actual value is supplied to the regulation device as a feedback signal (also referred to as feedback information or feedback).

Although the conventional control provides solutions for many problems, it is often desirable to go beyond the structure of such solutions and exceed their boundaries. For this purpose, learning a residual value control strategy (residual policy learning) provides an option to improve existing controllers with the aid of reinforcement learning (RL) by adding an additive "residual value" (also referred to as "residuum") to the output value of a given controller. However, the applicability of such an approach depends greatly on the structure of the controller (or the regulation device that contains the controller). Internal feedback signals of the regulation device often limit the RL algorithm in order to adequately change the control strategy and thus learn the task.

In fact, there are numerous tasks for which the approach of adding a residual value to the output of the regulation device, i.e., adding a residual action to the control action that is output by the regulation device (in the form of a control signal), does not function well for the controlled system, since the residual value control strategy causes a shift in the distribution of the feedback information, which the controller regards as an external disturbance which it attempts to resist. As a result, the residual actions that are output by an actuator according to the RL control strategy result in competition between function f implemented by regulation device, and the actuator, which operates according to control strategy $\pi_\theta$. This means, for example, that when the optimal action is the movement of end effector 104 to the left, the regulation device works against this disturbance and generates forces in order to restore the previous position. In addition, depending on the structure of the controller, the response of the regulation device to such a perceived external disturbance or to a persistent error may be very different. In some cases, it may even result in reduced safety, in particular when the residual control strategy does not guarantee that the output of the actuator is limited.

In the following discussion, an approach is described in which the above limitations are dealt with by changing (optionally also) the feedback signal to the regulation device according to an RL control strategy, instead of changing (only) the output of the regulation device (i.e., the control action) with the aid of a residual value. This means that instead of the superimposition of residual actions on the output of the regulation device, a piece of the residual feedback information (i.e., residual feedback) is superimposed on the feedback information which the regulation device receives from the environment, i.e., the controlled system. According to various exemplary embodiments, it is thus possible, for example, to achieve better performance when carrying out a contact-rich pin insertion task for the robot with security of the position and orientation. For example, robot arm 101 is to insert a pin 113 into a hole 114 (so-called peg-in-hole task).

For the following description of specific embodiments, it is assumed that a (conventional) regulation device 114 is already implemented in the control device, which is to be assisted by a residual control strategy 112 that is trained with the aid of RL, so that the control of robot arm 101 for a manipulation skill is improved (compared to the control with the aid of regulation device 114 without assistance).

For describing a manipulation skill in the presence of uncertainties, a formulation as a time-discrete and episodic partially observable Markov decision process (POMDP) is suitable. This POMDP is described by a tuple $\mathcal{M} = (\mathcal{S}, \mathcal{A}, \mathcal{O}, \mathcal{P}, \varepsilon, \mathcal{R}, \gamma)$. The parameters of this tuple correspond to the state space, the action space, the observation space, transition probabilities $\mathcal{P}(s_{t+1}|s_t, a_t)$, emission probabilities $\varepsilon(o|s)$, reward function $r(s, a)$, or the discount factor, where $s \in \mathcal{S}$, $a \in \mathcal{A}$, $o \in \mathcal{O}$. In addition, $R(\tau) = \Sigma_{i=t}^T \gamma^{i-t} r(s_i, a_i)$ is defined as a discounted gain, where $\tau = (s_t, a_t, \ldots, s_T, a_T)$ and $\gamma$ is the discount factor.

In reinforcement learning, the parameters of a control strategy $\pi_\theta: \mathcal{S} \times \mathcal{A} \mapsto [0, 1]$ are adapted (or optimized) in such a way that expected gain R is maximized; i.e., a solution of $$\operatorname*{argmax}_\theta \mathbb{E}_{\tau \sim p_\theta(\tau)}[R(\tau)]$$

is sought, where $p_\theta$ indicates the distribution of the trajectories that result due to the randomness of the transitions, observations, and control strategy.

Figure 2:
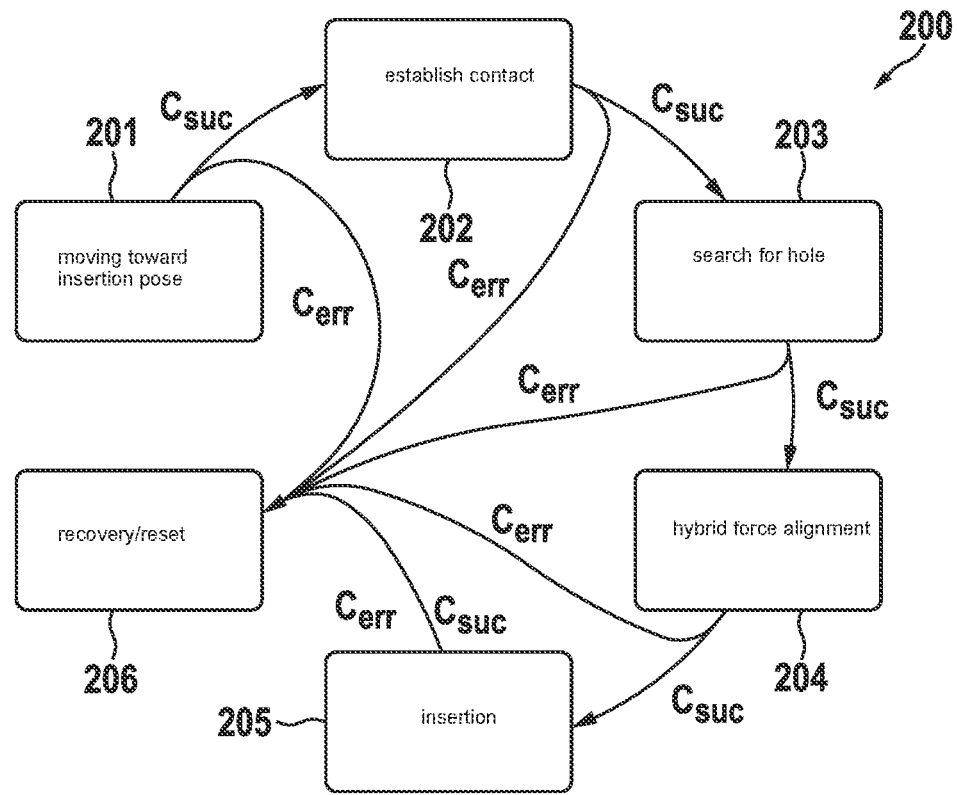
FIG. 2 shows a state machine according to one specific example embodiment of the present invention.

Control device 106 operates for a pin insertion task, for example, according to a state machine as illustrated in FIG. 2.

FIG. 2 shows a state machine 200 according to one specific embodiment.

State machine 200 contains five states 201 through 205. These are:

First state 201: moving toward the insertion pose. This brings the pin into an inclined position above a predefined hole position.

Second state 202: establish contact. This moves the pin in a predefined direction until it strikes a surface (in which the hole is situated).

Third state 203: search for hole. Here, the robot moves the pin along the surface while maintaining a constant force perpendicular to the surface for finding the hole. It is assumed that the tip of the pin is subsequently situated between the edges of the hole.

Fourth state 204: hybrid force alignment. The robot aligns the pin at a predefined orientation so that the pin is aligned perpendicularly with respect to the surface while it maintains a constant force on the surface.

Fifth state 205: insertion. Here, the robot exerts a force perpendicular to the surface in order to insert the pin, and sinusoidally oscillates the pin at the end effector.

State machine 200 evaluates in each state 201 through 205 a particular predefined success condition $C_{suc}$ during runtime. Only when this success condition is fulfilled does regulation device 114 continue with the next state (or subtasks). An additional state 206 is used for recovery if, in any of the states, a particular error condition $C_{err}$ is fulfilled or the insertion procedure is ended. In conjunction with RL, this state 206 is used for resetting to reinitialize the environment for the testing or training period. It may be selected which of states 201 through 205 is assisted with the aid of RL. According to various specific embodiments, for example an actuator (that operates according to an RL-trained control strategy) engages only in third state 203 and in fifth state 205.

The inputs for the regulation device contain, for example for each robot joint, the joint position, and the joint speed and force at a sampling rate of 1 kHz, together with outputs of the torque of one or multiple joints (for example, the end effector joint) at the same sampling rate. State machine 200 provides setpoint values to the regulation device at a frequency of 40 Hz, for example. For example, the actuator also generates outputs at this frequency according to the residual control strategy.

One configuration of the robot is an element $C \in \mathbb{R}^7$ in addition to angular velocity $\mathcal{V} \in \mathbb{R}^7$ of the joints, torques $\mathcal{T} \in \mathbb{R}^7$ of the joints, end effector pose $\mathcal{P} \in \mathbb{R}^7$, and pose of the object to be inserted $\mathcal{W} \in \mathbb{R}^6$. For each of these elements, superscripts "o", "u", and "π" are used when they represent the input of the regulation device, the output of the regulation device, or the output of the actuator. Accordingly, it is assumed that the regulation device includes a conventional controller that implements a mapping $f: \mathcal{C}^o \times \mathcal{V}^o \times \mathcal{T}^o \mapsto \mathcal{T}^u$. In addition, a distinction is made between the observations (i.e., the feedback information or the feedback of the controlled system) of the regulation device $o_1 \in \mathcal{C}^o \times \mathcal{V}^o \times \mathcal{T}^o$ and observations of the actuator $o_2 \in \mathcal{O}$.

Nevertheless, the approach discussed in this section is applicable regardless of the selection of f and of the observation spaces and action spaces.

In conventional learning of a residual value control strategy (residual policy learning), a residual control strategy is used according to which an actuator outputs residual actions, which are added to the output of the regulation device. However, depending on the architecture of the controller, the output of the regulation device may be adapted to various levels of the control, for example the joint forces or the end effector pose. This allows a space of control actions to be selected that is more suitable for the particular task.

As explained above, the conventional learning of a residual value control strategy does not function well for many tasks, since the regulation device works against the actuator, and therefore according to various specific embodiments the feedback signal to the regulation device is adapted according to an RL control strategy. This is referred to below as residual feedback learning (RFL), and various exemplary embodiments are described below.

Figure 3:
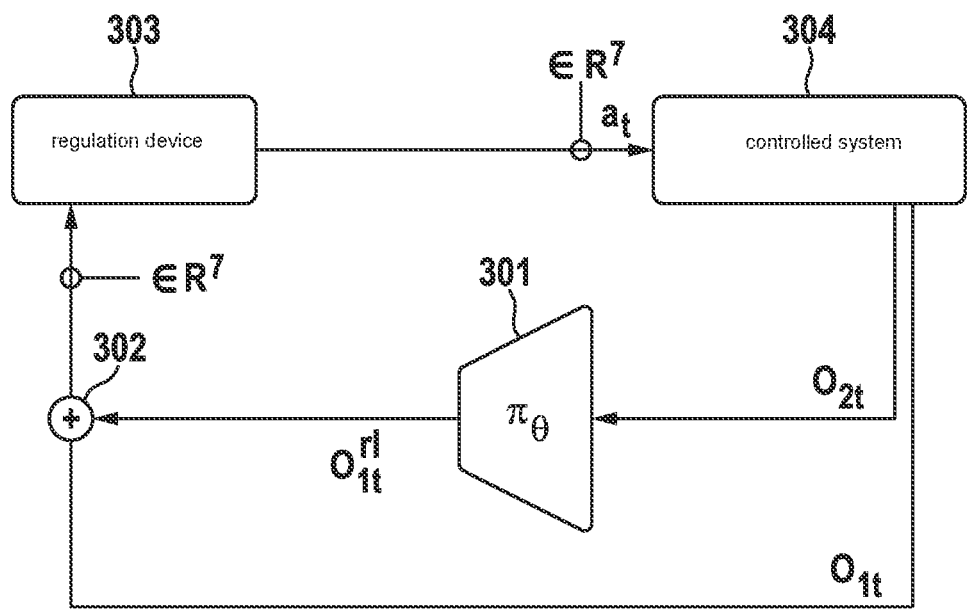
FIG. 3 illustrates residual feedback learning (RFL) according to one specific example embodiment of the present invention in which information concerning the joint positions is fed back, and an actuator output is superimposed on the information.
Figure 4:
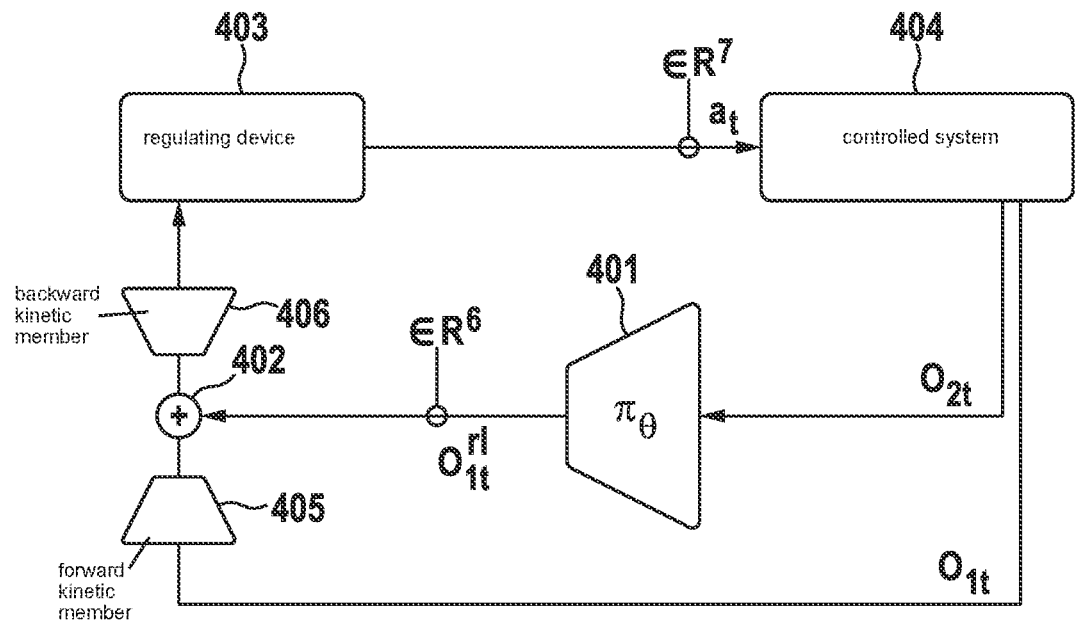
FIG. 4 illustrates residual feedback learning (RFL) according to one specific example embodiment of the present invention in which fed-back information is converted into an end effector pose that is superimposed on an actuator output.
Figure 5:
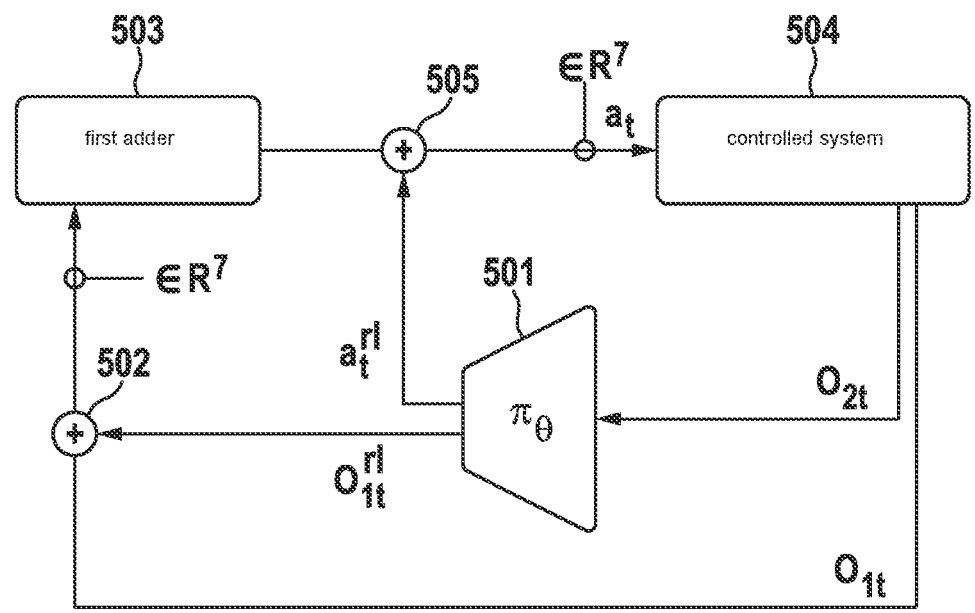
FIG. 5 illustrates hybrid reinforcement residual feedback learning according to one specific example embodiment of the present invention.

In FIGS. 3, 4, and 5, the input for the regulation device without RL assistance (i.e., the "actual" feedback information) is denoted by $o_1 = (q_t, v_t, t_t)$. The input (observation) for the particular actuator is denoted by $o_{2^t}$.

FIG. 3 illustrates residual feedback learning (RFL) according to one specific embodiment in which information concerning the joint positions is fed back, and an actuator output is superimposed on the information.

Accordingly, in this specific embodiment an actuator 301, which operates according to a control strategy, generates a set of joint positions of robot arm 101 as residual feedback information (residual feedback). The (residual feedback) control strategy is defined as $\pi_\theta: \mathcal{O} \times \mathcal{C}^\pi \mapsto [0, 1]$ and outputs for actuator 301 probabilities with which it is to select certain sets of correction joint positions. An adder 302 adds the set of correction joint positions output by actuator 301 to the (actual) feedback information for the regulation device, and supplies the sum to regulation device 303, which thus outputs a control action for controlled system 304 according to $$o_1^{rl} \sim \pi_\theta(\cdot | o_{2^t}), a_t = f(o_{1t} + o_1^{rl}, t).$$

In the example from FIG. 3, only feedback information for joint positions is superimposed by residual feedback; however, other feedback information may also be used and correspondingly superimposed, such as the angular velocities or torques of the joints, depending on the application.

FIG. 4 illustrates residual feedback learning (RFL) according to one specific embodiment in which fed-back information is converted into an end effector pose on which an actuator output is superimposed.

In this case, a piece of task space-centric residual feedback information is used, in that the (actual) feedback of controlled system 404 is converted into the task space, i.e., into an end effector pose, and after the superimposition with the output of actuator 401, is once again converted into a set of joint positions by an adder 402.

The conversion of joint positions into an end effector pose takes place via a forward kinematic member 405, and the conversion of the result of the superimposition into a set of joint positions takes place via a backward kinematic member 406. This conversion may be carried out quickly, since the output of actuator 401 makes only a small change to the feedback information, and the optimizer, which may be used for the inverse kinematics, may use the true (i.e., actual) feedback as a starting point for the optimization.

In this exemplary embodiment the (residual feedback) control strategy is defined as $\pi_\theta: \mathcal{O} \times \mathcal{P}^\pi \mapsto [0, 1]$, and outputs for actuator 401 probabilities with which it is to select certain end effector poses; i.e., $\mathcal{P}^{90}$ (space of the residual end effector poses) is the action space of actuator 401.

Regulating device 403 outputs a control action for controlled system 404 according to $$o_1^{rl} \sim \pi_\theta(\cdot | o_{2^t})$$

$$ee = FK(q_t), \widetilde{q}_t = IK(ee + o_1^{rl})),$$

$$a_t = f(\widetilde{q}_t, v_t, t_t)$$

FIG. 5 illustrates hybrid reinforcement residual feedback learning according to one specific embodiment.

The approach of adding a residual action according to a trainable control strategy to the output of the regulation device, and the approach, described with reference to FIGS. 3 and 4, of instead adding residual feedback according to a trainable control strategy to a piece of feedback information, have their respective advantages, depending on the phase of performing the skill. Therefore, according to one specific embodiment, a combination of the two approaches is used.

In the example from FIG. 5, the action space of actuator 501 is expanded to 14 dimensions, the first seven dimensions indicating residual control action $a_t^{rl}$, and the other seven dimensions indicating residual feedback $o_1^{rl}$.

Accordingly, the control strategy in this exemplary embodiment is defined as $\pi_\theta: \mathcal{O} \times \mathcal{T}^\pi \times \mathcal{C}^\pi \mapsto [0, 1]$, and outputs for actuator 501 probabilities with which it is to select certain combinations of residual control action and residual feedback.

A first adder 503 superimposes the residual feedback on the (actual) feedback, and a second adder 505 superimposes the residual control action of the control action that is output by regulation device 503.

Controlled system 504 thus obtains a control action according to $$a_t^{rl}, o_1^{rl} \sim \pi_\theta(\cdot | o_{2^t}), a_t = f(o_{1t} + o_1^{rl}, t) + a_t^{rl}.$$

In the example from FIG. 5, residual feedback $\mathcal{C}$ is an element of the space of the joint positions (it may also be used, such as in the example from FIG. 4, as residual feedback such as in the end effector space). For simplicity, it is assumed that sum $o_{1t} + o_1^{rl}$ is a superimposition of $o_1^{rl}$ and corresponding joint position components of $o_1^{rl}$.

The control strategy (or the actuator) may be implemented with the aid of a neural network, for example, for example with the aid of a convolution network in the case that pieces of feedback information $o_{2^t}$ supplied to the control strategy are images (RGB images, for example), optionally followed by completely joined layers (for example, including layers for a critic in the case of a training with the aid of actor-critic architecture).

Feedback information $o_{2^t}$ for the control strategy may also be made up solely of proprioceptive feedback and contact force measurements at the joints. For example, in this case an actor-critic architecture including a shared long short-term memory (LSTM) network may be used.

Figure 6:
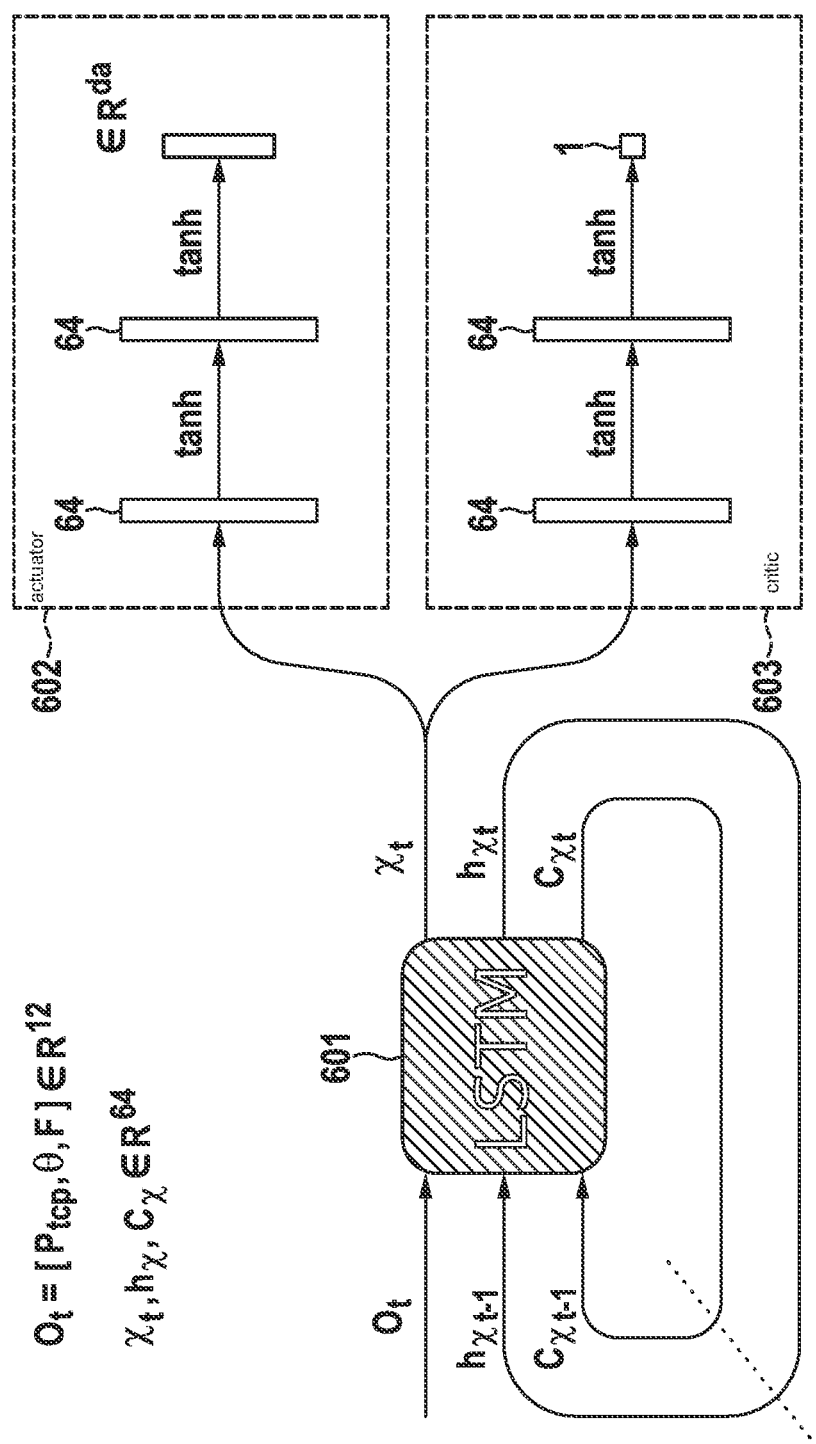
FIG. 6 shows an example of an actor-critic architecture for the training of a control strategy, in accordance with an example embodiment of the present invention.

FIG. 6 shows an example of an actor-critic architecture for the training of a control strategy.

The architecture contains an LSTM network 601, followed by completely joined layers for actuator 602 or critic 603. Actuator 602 ascertains, for example, the parameters of a Gaussian distribution from which the actuator samples its actions. For the training, the randomness (of the hole position and hole orientation, for example) may be changed as a function of the instantaneous success rate of the control strategy (for example, decreased if the success rate is below 0.6 and increased if the success rate is above 0.7).

Arbitrary RL methods, for example Proximal Policy Optimization (PPO) or Deep Deterministic Policy Gradient (DDPG), may be used for training the control strategy.

Figure 7:
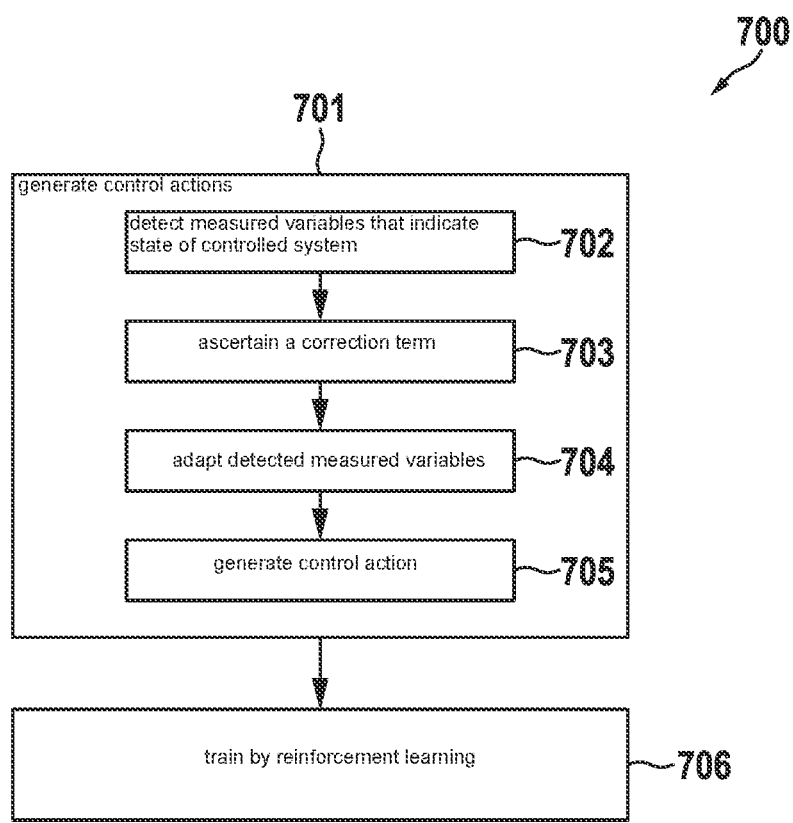
FIG. 7 shows a flowchart illustrating a method for training a control arrangement for a controlled system according to one specific example embodiment of the present invention.

In summary, a method is provided according to various specific embodiments, as illustrated in FIG. 7.

FIG. 7 shows a flowchart 700 illustrating a method for training a control arrangement for a controlled system according to one specific embodiment.

The control arrangement includes a regulation device and an actuator that operates according to a control strategy.

Control actions are generated by regulation device in 701.

Each control action is generated in 702 by detecting measured variables that indicate a state of the controlled system, ascertaining a correction term for the detected measured variables by the actuator in 703 according to the control strategy, adapting the detected measured variables using the correction term for the detected measured variables in 704, and generating the control action in 705 by supplying the adapted measured variables to the regulation device as the actual value.

The control strategy is trained by reinforcement learning in 706 for maximizing the use that is achieved by the generated control actions.

It should be noted that it is not necessary to generate all control actions and subsequently train the control strategy; this may also take place in an alternating or interlaced manner.

The method from FIG. 7 may be carried out by one or multiple computers that include one or multiple data processing units. The term "data processing unit" may be understood as any type of entity that enables the processing of data or signals. The data or signals may be treated, for example, according to at least one (i.e., one or more than one) particular function that is carried out by the data processing unit. A data processing unit may include an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination of same or may be formed from same. Any other way of implementing the particular functions, described in greater detail herein, may also be understood as a data processing unit or logic circuit system. One or multiple of the method steps described in detail here may be carried out (implemented, for example) by a data processing unit via one or multiple particular functions that are carried out by the data processing unit.

The approach from FIG. 7 is used to generate a control signal for a controlled system, for example a robotic device. The term "robotic device" may be understood to mean any physical system (including a mechanical part whose movement is controlled), such as a computer-controlled machine, a vehicle, a household appliance, a power tool, a production machine, a personal assistant, or an access control system. A control rule for the physical system is learned, and the physical system is then correspondingly controlled.

Various specific embodiments may receive and use sensor signals from various sensors such as video sensors, radar sensors, LIDAR sensors, ultrasonic sensors, motion sensors, thermal imaging sensors, etc., in order to obtain, for example, sensor data concerning states of the system (robot and object or objects) as well as configurations and scenarios. The sensor data may be processed. Specific embodiments may be used to train a machine learning system and control a robot, for example autonomously by robot manipulators, in order to implement various manipulation tasks under various scenarios. In particular, specific embodiments for controlling and supervising the performance of manipulation tasks may be applied in assembly lines, for example. They may be integrated, seamlessly, for example, into a conventional GUI for a control process.

Although particular specific embodiments have been illustrated and described here, it is recognized, in view of the disclosure herein, by those skilled in the art in the field that the particular specific embodiments shown and described may be exchanged with numerous alternative and/or equivalent implementations without departing from the scope of protection of the present invention. The present patent application is intended to encompass any adaptations or variations of the particular specific embodiments discussed here.

What is claimed is:

1. A method for training a control arrangement for a controlled system, the control arrangement including a regulation device and an actuator that operates according to a control strategy, the method comprising the following steps:

generating control actions by the regulation device, each of the control actions being generated by:
detecting measured variables that indicate a state of the controlled system,
ascertaining a correction term for the detected measured variables by the actuator according to the control strategy,
adapting the detected measured variables using the correction term for the detected measured variables, and
generating the control actions by supplying the adapted measured variables to the regulation device as the actual value,
and
training the control strategy by reinforcement learning for maximizing a gain that is achieved by the generated control actions, wherein generating at least one of the control actions further includes:
executing the control strategy to output, for the actuator, probabilities with which the actuator selects a set of correction joint positions,
adding the set of correction joint positions selected by the actuator to feedback information for the regulation device to produce a sum, and
supplying the sum to the regulation device, wherein the regulation device outputs the at least one of the control actions.

2. The method as recited in claim 1, further comprising:
for each of the control actions, ascertaining a correction term for an output of the regulation device by the actuator according to the control strategy, and generating the control action by adapting the output of the regulation device, using the correction term for the output of the regulation device.

3. The method as recited in claim 1, wherein the controlled system is a robot including an end effector, the correction term for the detected measured variables by the actuator being an end effector pose correction, and the detected measured variables containing a set of joint positions, and the adaptation of the detected measured variables using the correction term for the detected measured variables, including the conversion of the set of joint positions into an end effector pose, adapting the end effector pose, and back-converting the adapted end effector pose into an adapted set of joint positions.

4. The method as recited in claim 1, further comprising:
for each of the control actions, detecting further measured variables that indicate the state of the controlled system, and ascertaining the correction term for the detected further measured variables by the actuator according to the control strategy by processing the detected further measured variables using a neural network.

5. A robotic control device, comprising:
a control arrangement;
a regulation device; and
an actuator;
wherein the robotic control device is configured to train the control arrangement for a controlled system, the control arrangement including the regulation device and the actuator that operates according to a control strategy, the robotic control device configured to:
generate control actions by the regulation device, each of the control actions being generated by:
detecting measured variables that indicate a state of the controlled system,
ascertaining a correction term for the detected measured variables by the actuator according to the control strategy,
adapting the detected measured variables using the correction term for the detected measured variables, and
generating the control actions by supplying the adapted measured variables to the regulation device as the actual value,
and
train the control strategy by reinforcement learning for maximizing a gain that is achieved by the generated control actions, wherein generating at least one of the control actions further includes:
executing the control strategy to output, for the actuator, probabilities with which the actuator selects a set of correction joint positions,
adding the set of correction joint positions selected by the actuator to feedback information for the regulation device to produce a sum, and
supplying the sum to the regulation device, wherein the regulation device outputs the at least one of the control actions.

6. A non-transitory computer-readable medium on which are stored commands for training a control arrangement for a controlled system, the control arrangement including a regulation device and an actuator that operates according to a control strategy, the commands, when executed by a processor, causing the processor to perform the following steps:
generating control actions by the regulation device, each of the control actions being generated by:
detecting measured variables that indicate a state of the controlled system,
ascertaining a correction term for the detected measured variables by the actuator according to the control strategy,
adapting the detected measured variables using the correction term for the detected measured variables, and
generating the control action by supplying the adapted measured variables to the regulation device as the actual value,
and
training the control strategy by reinforcement learning for maximizing a gain that is achieved by the generated control actions, wherein in order to generate at least one of the control actions, the processor is further configured to:
execute the control strategy to output, for the actuator, probabilities with which the actuator selects a set of correction joint positions,
add the set of correction joint positions selected by the actuator to feedback information for the regulation device to produce a sum, and
supply the sum to the regulation device, wherein the regulation device outputs the at least one of the control actions.

* * * * *